United States Patent [19]
Bubeck et al.

[11] Patent Number: 4,488,744
[45] Date of Patent: Dec. 18, 1984

[54] CLAMP FOR JOINING TOGETHER A PAIR OF FLANGES

[75] Inventors: Friedrich Bubeck, Pforzheim; Uwe Reimpell, Hanau-Wilhelmsbad, both of Fed. Rep. of Germany

[73] Assignee: Leybold-Heraeus GmbH, Cologne, Fed. Rep. of Germany

[21] Appl. No.: 328,352

[22] Filed: Dec. 7, 1981

[30] Foreign Application Priority Data

Dec. 23, 1980 [DE] Fed. Rep. of Germany ....... 3048903

[51] Int. Cl.³ ............................................. F16L 23/00
[52] U.S. Cl. .................................. 285/408; 285/411; 285/365; 285/367
[58] Field of Search ............... 285/408, 411, 410, 365, 285/366, 367; 24/279, 284, 285

[56] References Cited

U.S. PATENT DOCUMENTS

| 1,093,868 | 4/1914 | Leighty | 24/285 |
| 2,895,748 | 7/1959 | Oldham | |
| 3,105,281 | 10/1963 | Doherty | 24/285 X |
| 3,661,409 | 5/1972 | Brown | 285/367 X |

FOREIGN PATENT DOCUMENTS

| 3000504 | 7/1980 | Fed. Rep. of Germany |
| 2005784 | 4/1979 | United Kingdom |

Primary Examiner—Richard J. Scanlan, Jr.
Attorney, Agent, or Firm—Felfe & Lynch

[57] ABSTRACT

A clamp for joining a pair of flanges has a clamp chain with grooved clamp shoes thereon which, in the closed position of the clamp, straddle the edges of the flanges to press them together. At least some of the clamp shoes are fastened to the clamp chain through an intermediate member which pivots at both the clamp chain and the clamp shoe.

8 Claims, 2 Drawing Figures

CLAMP FOR JOINING TOGETHER A PAIR OF FLANGES

BACKGROUND

The invention relates to a clamp for joining together a pair of flanges, the clamp having a multiple-link clamp chain and clamp shoes thereon and having wedge-shaped inner grooves, which straddle the edges of the flanges and press them against one another.

In clamps of this kind, the problem exists that at least some of the clamp shoes perform not only radial clamping movements but also movements in a radial-tangential direction during the closing process. In particular the clamp shoes situated nearest the clamp chain closure perform movements greatly deviating from the radial direction. In the final phase of the closing process, these movements are almost exclusively tangential in order to exert radially-directed clamping forces on the more remote shoes. During this last phase of the closing movement, therefore, the chain closing forces have to overcome the friction of the virtually tangential movements which contributes nothing to pressing the flanges together as well as produce the necessary radial flange pressing forces. A disadvantageous consequence of this is that very high pressing forces, which are necessary, for example, in the case of metal gaskets, cannot be brought to bear or can be applied only such that they are irregularly distributed over the circumference.

It is known from French Pat. No. 1,311,377 (FIGS. 11 and 12) to construct the clamp shoes in the form of wheels having a wedge-shaped circumferential groove. In this manner the sliding friction is replaced by a rolling friction. It is a great disadvantage, however, that the wheels make only a point or line contact with the edges of the flange and, at extremely high closing pressures, this leads to deformation of the flange edges. Such deformation interferes with the even rolling of the clamp shoes and thus with the even transmission of the clamping forces to the other shoes. The disadvantage of an uneven distribution of the pressure over the circumference of the flange is therefore not eliminated. In the subject matter of German Offenlegungsschrift No. 2,404,890, the longitudinal curvatures of the clamp elements is made greater than the curvatures of the flange itself. In this manner, greater bearing surfaces are created which are intended to eliminate deformation. Furthermore, the clamp links perfrom tilting and sliding movements during the closing process. The friction due to tangential sliding components of movement, which has to be overcome by the closing force, is therefore not as great, but it is nevertheless still present.

THE INVENTION

It is the object of the present invention to create a clamp for joining together a pair of flanges, comprising a multiple-link clamp chain and clamp shoes mounted thereon each shoe having a wedge-shaped inner groove for straddling the edges of the flanges to press them together, in which clamp at least some of the clamp shoes will perform exclusively radial movements during the closing and opening process.

This object is achieved in accordance with the invention in that at least some of the clamp shoes are fastened to the clamp chain through respective intermediate members, each intermediate member being pivotally joined both to the clamp chain and to the clamp shoe. In a clamp having these features, the possibility exists for the chain to perform tangentially-directed movements during closing without the clamp shoes accompanying this movement. All that occurs is a pivoting movement of the intermediate member articulately joining the two parts. Two important advantages of this invention are that the flange-pressing forces distribute themselves uniformly over the circumference, and that virtually no additional shoe-sliding friction has to be overcome by the closing force. Also curvature of the inner groove of the clamp surfaces can be made equal to the curvature of the flange edges, so that high local pressures resulting in deformation of the flange edges need no longer be feared. Another important advantage lies in the fact that the invention is especially suitable for metal-gasketed pairs of flanges having large diameters (1000 mm and more) which require high pressing forces.

DESCRIPTION OF THE DRAWINGS

Other advantages and details of the invention are to be explained in conjunction with an embodiment represented in FIGS. 1 and 2, wherein.

DESCRIPTION OF THE PREFERRED EMBODIMENTS

Figure 1:
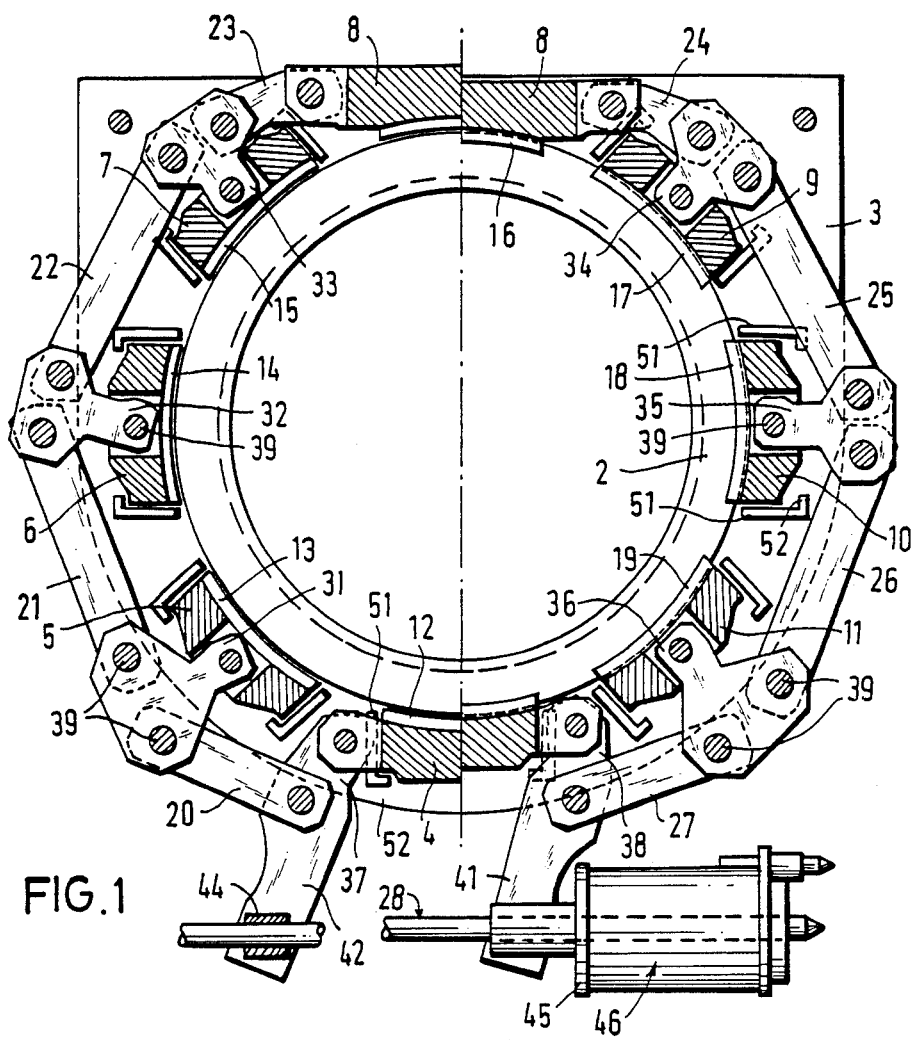
FIG. 1 is a cross section through the clamp of the invention at the plane of contact between the flanges.

In the figures, the flanges to be joined together are referenced 1 and 2. Flange 2 is welded to a vessel 3. It is apparent from FIG. 1 that a total of eight clamp shoes 4 to 11 are provided, these being uniformly distributed on the circumference of the flanges. The clamp shoes have each a wedge-shaped inner groove 12 to 19 whose curvature is the same as the curvature of the flange edges. The right half of FIG. 1 shows the position of the clamp in its closed position, i.e., the wedge-shaped grooves of the clamp shoes straddle the flange edges and press them together. The left half of the figure shows the open position, in which the clamp shoes are in their withdrawn position.

To shift the clamp shoes between their open and their closed positions there is provided a clamp chain comprising a total of ten links. Eight of the links, 20 to 27, are links which are conventionally articulated together. A nineth chain link 28 is variable in length and thus serves for the closing and opening of the clamp of the invention, i.e., the calmp chain is endless both in the closed state and in its open state. The chain link opposite chain link 28 is identical with the clamp shoe 8.

The clamp shoes 5 to 7 and 9 to 11 are joined to the clamp chain through intermediate members 31 to 36. The intermediate members are pivotally attached both to the clamp shoes and to the clamp chain. For the sake of simplicity, the pivots are generally designated by the number 39 instead of being provided with different reference numbers. In the embodiment represented, each intermediate member is joined to the clamp chain by two pivots. These pivots serve simultaneously to connect the chain links to one another. However, it is easily possible to use only one pivot instead of these two pivots.

Two intermediate members 37 and 38 are associated with the clamp shoe 4. They are pivotally attached laterally to the clamp shoe 4 and have the prolongations 41 and 42 extending beyond the pivots of the adjacent chain links. Between the free ends of these prolongations there is provided the chain link 28 which is variable in length and consists of a threaded spindle 43 which is associated with a nut 44 pivotally mounted on the prolongation 42. A mounting 45 for a crank mechanism 46 is pivotally attached to the prolongation 41. By means of this crank drive the clamp chain can be moved back and forth between its open position (left half of FIG. 1) and its closed position (right half).

During such movement, the clamp shoes 4 to 11 also shift from their open position to their closed position and vice-versa. So that these movements may take place in a controlled manner, i.e., in the desired, exclusively radial direction, guides 51 are associated with the clamp shoes. It is desirable for these guides to be provided on both sides of the clamp shoes and that they have a stop 52 to fix the clamp shoes in their open position. These stops provide the assurance that all clamp shoes will be moved to their open position, even if the shoes are unequally released from the flange edge.

Clamp shoe 8 is the only clamp shoe that is not attached to the clamp chain by an intermediate member. It serves as a clamp chain link by itself. This is possible only because it is situated precisely opposite the variable-length chain link 28, i.e., the closing link of the clamp chain. In the area of all the other clamp shoes, the chain links perform tangential movements with respect to the clamp shoes. These tangential movements, however, are not transmitted to the clamp shoes on account of the intermediate members and the guides.

Figure 2:
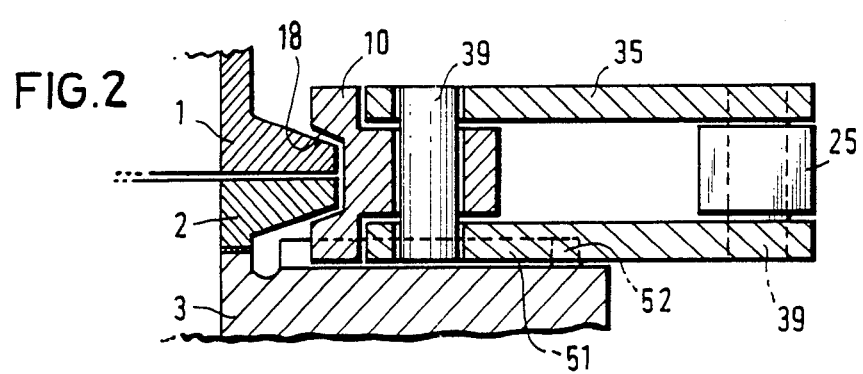
FIG. 2 is a cross section perpendicular thereto through the edges of the flanges and through an intermediate member provided in accordance with the invention.

In FIG. 2 the clamp shoe 10 is again shown, with the intermediate member 35. It can be seen how, for example, the guide 51 with the stop 52 can be disposed. In the case of the embodiment represented in FIG. 2, the guide 51 is fastened on a vessel 3 to which in turn the flange 2 is welded.

The described embodiment is especially suited for metal-gasketed flange joints of large diameter, since it permits high clamping forces to be applied without distortion due to tangentially directed components of movement of the clamp shoes. The guides 51 with their stops 52 provide definite positioning of the clamp shoes in their open state. The clamp of the invention is therefore also suitable for remote control, even though it is shown with a hand-operated crank drive. It may furthermore be advantageous to associate with the crank drive an expansion compensator, which can consist in a known manner of plate springs. In this manner overstresses caused by thermal expansion can be prevented.

Some of the intermediate members can have a different length to provide control of the distances they move during the opening or closing movement and control of the forces acting on the individual clamp shoes.

We claim:

1. In a clamp for joining together a pair of flanges, the clamp having a multiple-link clamp chain, means for closing about the flanges and clamp shoes thereon, each clamp shoe having a wedge-shaped inner groove which, in the closed state of the clamp, straddles the edges of the flanges and, with the closing force of the chain means, presses them together, the improvement comprising: intermediate members for connecting respective clamp shoes to the chain means and means for pivotally joining the intermediate members both to the chain means and to the respective clamp shoes.

2. Clamp of claim 1, and further comprising: radial guide means associated with the respective clamp shoes for guiding the respective clamp shoes radially toward the flanges when the chain means is closed about them.

3. Clamp of claim 2 wherein the guide means are guide rails (51) disposed laterally of each respective clamp shoe on a portion of one of the flanges.

4. Clamp of claim 3, wherein each guide rail (51) as a stop (52) outward of the associated clamp shoe from the flanges for holding the clamp shoes about the flanges when the chain means is not closed thereabout.

5. Clamp of claim 1 wherein the clamp chain means comprises an endless chain and one clamp chain link (28) of variable length.

6. Clamp of claim 5, wherein the clamp chain link (28) of variable length comprises a rotatable threaded spindle and two outwardly prolonged intermediate members situated side by side and connecting the spindle to the chain means.

7. Clamp of claim 5 or 6, and further comprising an expansion compensator associated with the clamp chain link of variable length.

8. Clamp of claim 1, 2, 3, 4, or 5, wherein some of the intermediate members are of different length than others.

* * * * *

UNITED STATES PATENT AND TRADEMARK OFFICE
CERTIFICATE OF CORRECTION

PATENT NO. : 4,488,744
DATED : Dec. 18, 1984
INVENTOR(S) : Friedrich Bubeck, et al.

It is certified that error appears in the above-identified patent and that said Letters Patent is hereby corrected as shown below:

Claim 4, line 1 "as" should be -- has --.

Signed and Sealed this

Sixth Day of August 1985

[SEAL]

Attest:

DONALD J. QUIGG

Attesting Officer  Acting Commissioner of Patents and Trademarks